United States Patent [19]

Sparrevohn

[11] 3,906,162

[45] Sept. 16, 1975

[54] LOOP EXTENDER WITH BYPASS CAPACITOR DISCHARGE

[75] Inventor: Frederic R. Sparrevohn, Long Beach, Calif.

[73] Assignee: Communication Mfg. Co., Long Beach, Calif.

[22] Filed: July 30, 1974

[21] Appl. No.: 493,166

[52] U.S. Cl. .......... 179/16 F

[51] Int. Cl. .......... H04b 3/36; H04q 1/30

[58] Field of Search .......... 179/16 E, 16 EA, 16 F

[56] References Cited

UNITED STATES PATENTS

| | | | |
|---|---|---|---|
| 3,757,052 | 9/1973 | Tothill | 179/16 F |
| 3,781,480 | 12/1973 | Roge | 179/16 F |

*Primary Examiner*—Kathleen H. Claffy
*Assistant Examiner*—Randall P. Myers
*Attorney, Agent, or Firm*—Christie, Parker & Hale

[57] ABSTRACT

A telephone loop extending circuit for aiding central office battery. Each voltage insertion circuit includes the following: First and second pairs of terminals, first and second voltage sources, first and second transistors having base electrodes and emitter-collector electrode circuits. First sides of the first and second voltage sources, of opposite voltage polarity, are coupled to a first terminal of the corresponding pair. One side of the emitter-collector electrode circuit of each of the transistors is coupled to a second terminal of the corresponding pair. The other sides of the emitter-collector electrode circuits of the first and second transistors are individually coupled to second sides of, respectively, the first and second voltage sources. First and second optical coupling means are provided for the first and second transistors, respectively, each for sensing current flow between terminals of a pair and each being responsive to current flow in one of two opposite directions between terminals for enabling the corresponding transistor to couple the corresponding voltage source to the second terminal of the corresponding pair. A bypass capacitor is coupled from one terminal to the other of the corresponding pair for passing selected signals around the transistors and voltage sources from terminal to terminal. A resistor is coupled from the base electrodes of both transistors to the first sides of the voltage sources and is operative in combination with at least one of the transistors for providing a discharge path for the bypass capacitor after an externally applied signal is removed from terminals of the corresponding pair.

7 Claims, 3 Drawing Figures

LOOP EXTENDER WITH BYPASS CAPACITOR DISCHARGE

BACKGROUND OF THE INVENTION

This invention relates to the transmission of telephone signals and, more particularly, to an improved loop extender for increasing battery voltage in the subscriber loop.

In telephone systems, a two wire loop is provided between a central office and a subscriber's telephone set. A direct current (D.C.) voltage signal is supplied between the two sides of the loop at the central office. The D.C. voltage is referred to as central office battery. When a subscriber's telephone set goes off hook, an on-off-hook switch is closed, allowing current to flow around the loop. In simplex systems a D.C. voltage is applied to each of the two sides of the loop and the other two ends of the loops are grounded at the subscribers telephone. The current flowing to the central office around the loop or, in simplex systems along the line, is quite important at the central office as it is sensed and its presence is used to cause various control functions such as line finding and maintaining a connection to the subscriber's line.

As the telephone lines become longer, the resistance in the loop increases and finally a point is reached along the line where the current flowing cannot be reliably sensed by the central office equipment and therefore malfunctions occur in the dial equipment, line finding equipment and the circuit for maintaining a connection to the subscriber's line.

Various means have been used to eliminate the aforementioned problem. One approach is to provide voltage insertion or booster circuits, one in each side of the loop, each voltage insertion circuit when switched on applies a voltage in series in the corresponding side of the loop in a direction which aids the central office battery. However, such prior art insertion circuits suffer from a number of disadvantages and others have characteristics which are undesirable in specialized applications.

One type of prior art voltage insertion circuit senses voltage across the subscriber's loop for switching into operation. This voltage sensitive type of insertion circuit suffers from the serious disadvantage that it must always be positioned near the central office. If, for example, the voltage-type insertion circuit is positioned along a long subscriber loop, voltage across the two sides of the loop may decrease to the point where the voltage across the loop cannot be reliably sensed. In this case, the voltage-sensitive voltage insertion circuit will not reliably operate.

An alternative type of voltage insertion circuit is current sensitive. The current sensitive voltage insertion curcuit will detect a predetermined level of current flowing around the loop and responsive to the predetermined level of current, will switch on, thereby inserting the voltage into the two sides of the loop, thereby aiding central office battery. Those current sensitive insertion circuits which have been tested have been found to malfunction under certain conditions. Specifically, it has been found that when the combined insertion voltage introduced on both sides of the loop is substantially equal to or greater than that of the central office battery, these units will latch up and will not reliably reverse the polarity of the insertion voltage when polarity of central office battery reverses.

An improved telephone loop extending circuit exists for aiding central office battery and has first and second voltage insertion circuits. Each circuit has a circuit path for current flow coupled between terminals of, respectively, first and second pairs of terminals. Each circuit has first and second voltage sources and first and second transistors with first sides of the first and second voltage sources, of opposite voltage polarity coupled, in the circuit path, to the first terminal of the corresponding terminal pair. The emitter-collector electrode circuits of the first and second transistors are coupled, in the circuit path, from a second terminal of the corresponding pair to second sides of, respectively, the first and second voltage sources. Each circuit also has an optical coupler for each transistor. Each optical coupler has a light responsive control element coupled to the base electrode of the corresponding transistor for controlling current flow therein and a light emitting sensing element coupled in series in the circuit path for sensing externally applied current flow between terminals of the corresponding pair and for applying light to the corresponding light responsive element, thereby causing the latter to switch the corresponding transistor into saturated conduction coupling the corresponding voltage source in series in the circuit path and in between terminals of the corresponding pair. A bypass capacitor bypasses selected signals around the portion of the circuit path formed by the transistors and voltage sources between two places along the circuit path. Significantly a resistor is coupled from the base electrodes of the transistors in the first circuit to the base electrodes of the transistors in the second circuit. The combination of the resistor and transistors is operative in response to a rapid reversal of polarity of an applied voltage between two terminals, one from each of the terminal pairs, while the voltage source is coupled in one direction of polarity for enabling the conductive conditions of the first and second transistors to reverse and thereby reverse the polarity of the voltage source coupled between terminals of each pair.

The improved loop extending circuit has a number of advantages over the prior loop extending circuits. A primary feature is that it may be positioned anywhere along the loop up to just past mid resistance point between central office and the subscribers telephone set. However, due to the resistor coupled between the two voltage insertion circuits, an anti-ringing circuit is required to prevent the voltage source from being switched in when the central office applies an A.C. ringing voltage across the loop. This introduces increased cost and complexity and requires special maintenance. Additionally, the improved circuit, as well as the aforementioned voltage sensitive circuits are polarity sensitive in that the circuits may only be connected in the line in one direction between terminals of any one pair. This of course introduces possibility for installation errors.

The aforementioned voltage sensitive loop extending circuit is not suitable for simplex operation where a positive or negative voltage is applied at one terminal or a terminal pair and ground is applied at the other terminal of the same terminal pair.

The aforementioned improved loop extending circuit, although improved over the previous voltage and current sensitive loop extending circuits, has an undesirable characteristic in certain special applications. Telephone systems, such as those employing the computerized Electronic Switching System, momentarily disconnect the loop at the central office after a subscriber goes off hook. The central office initially connects central office battery across the loop, the subscriber goes off hook and thereby completes the circuit around the loop and then the central office battery is momentarily disconnected and then subsequently reconnected. Under these conditions, the improved circuit has been found to momentarily apply a reverse polarity signal in the loop, thereby causing the central office to sense an erroneous signal that is interpreted as a dial pulse. This causes erroneous results in the telephone central office equipment.

SUMMARY OF THE INVENTION

Briefly, an embodiment of the present invention is quite similar to the aforementioned improved loop extending circuit except that the resistor connected between base electrodes of the transistors in the two circuits is removed. In place thereof an impedance means is coupled in each circuit between the base electrodes of the first and second transistors and the first sides of voltage sources. The impedance means is operative, in combination with at least one of the corresponding transistors for providing a discharge path for the corresponding bypass capacitor after central office battery is removed from a terminal of the corresponding pair.

This arrangement has a number of advantages over the aforementioned prior art loop extending circuits. Among the advantages are that special anti-ringing supression circuits are not required, erroneous signals appearing to be dial pulses are eliminated during momentary disconnects at the central office and the circuit can be connected in either direction of polarity in a telephone loop.

DESCRIPTION OF THE PREFERRED EMBODIMENT

Figure 1A:
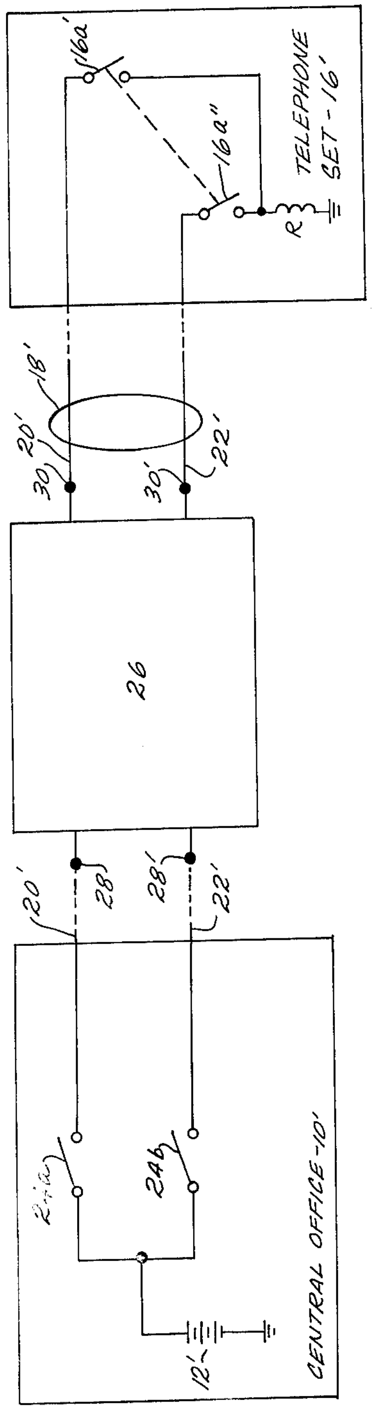
FIG. 1*A* shows a schematic and block diagram of a telephone loop connected telephone central office in a simplex configuration.
Figure 1:
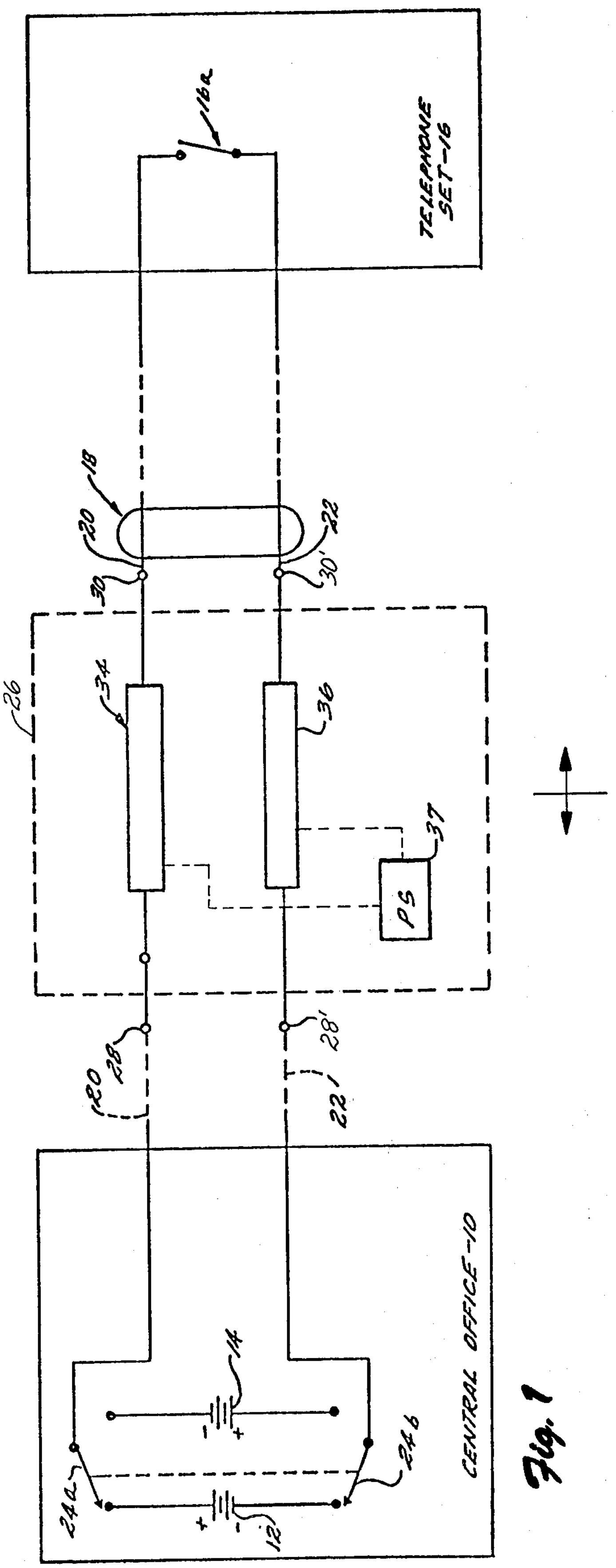
FIG. 1 shows a schematic and block diagram of a telephone loop having a loop extending circuit therein and embodying the present invention.

Refer now to the schematic and block diagram of a telephone system shown in FIG. 1. Included is a central office 10 having positive and negative central office batteries 12 and 14. It will be recognized that the batteries 12 and 14 may be various types of sources of direct current potential but are referred to herein for simplicity as batteries. A telephone 16 with the on-off hook switch 16*a* is coupled to the central office 10 by way of telephone lines 20 and 22. The overall loop including the path through the central office battery and the on-off-hook 16*a* in the telephone set 16 is referred to as telephone loop 18.

Loop extender 26 embodying the present invention is connected in series in the loop 18. As indicated by the arrows underneath the loop extender 26, it may be positioned at any point along the loop 18 in between the central office 10 and the telephone set 16.

Line equipment (not shown) in the central office 10 senses dial pulses, applies ringing voltage across the lines 20 and 22, and provides the required connection to the upper and lower lines 20 and 22 of the loop 18.

The central office depicted in FIG. 1 shows the switches 24*a* and 24*b* connecting the lines 20 and 22 in one direction of polarity across the battery 12 or, in the opposite direction of polarity, across the battery 14.

FIG. 1*a* is an alternate arrangement to that depicted in FIG. 1 which also employs the loop extender 26 embodying the present invention, but which uses a central office 10′ and telephone set 16′, which are connected in a simplex arrangement. The battery 12′ has its positive side connected to the poles of switches 24*a*′ and 24*b*′, the normally open contacts of which are connected to the lines 20′ and 22′ of loop 18′. The terminals 28 and 30 of the loop extender 26 are connected in series in the upper line 20′ of the loop 18′, whereas the terminals 28′ and 30′ are connected in the lower line 22′ of the loop 18′. The telephone set 16′ is shown with on-off-hook switches 16*a*′ and 16*a*″ for connecting the lines 20′ and 22′, respectively, to ground.

Considering the operation of the circuit in FIG. 1, central office 10 either has the switches 24*a* and 24*b* connected across battery 12, or battery 14. When the telephone set 16 goes off hook, the contacts 16*a* close, thereby completing the loop 18 from the central office 10 through the telephone set 16. To be explained in more detail the loop extender 26 has voltage insertion circuits 34 and 36 which sense the current flow clockwise around the loop 18 and each switches in a voltage source in series aiding to that of central office battery 12. In other words, the voltage source is inserted in series from − to +, from terminal 28 to terminal 30, and from − to + from terminal 30′ to terminal 28′. Should the switches 24*a* and 24*b* connect in the battery 14, the polarity of the central office battery is thereby reversed and the polarity of the voltage sources inserted in between terminals 28 and 30 and 30′ and 28′ is also reversed so it is in series aiding with the central office battery.

The simplex system depicted in FIG. 1*a* is normally employed with a coin operated telephone set. When the coins are inserted, switches 16*a*′ and 16*a*″ close together, completing the circuit from both of lines 20′ and 22′ to ground through a relay coil R. When the central office is ready to collect coin deposits at the telephone sets, the switches 24*a*′ and 24*b*′ are closed, completing the path from the battery 12′ to the telephone set 16′. As a result, the loop extending circuit 26 senses current flow from left to right through both of the insertion circuits 34 and 36 (not shown in FIG. 1*a*) and switches in a voltage source which is positive on terminals 30 and 30′ with respect to terminals 28 and 20′. (The opposite polarity is used to return coins).

Figure 2:
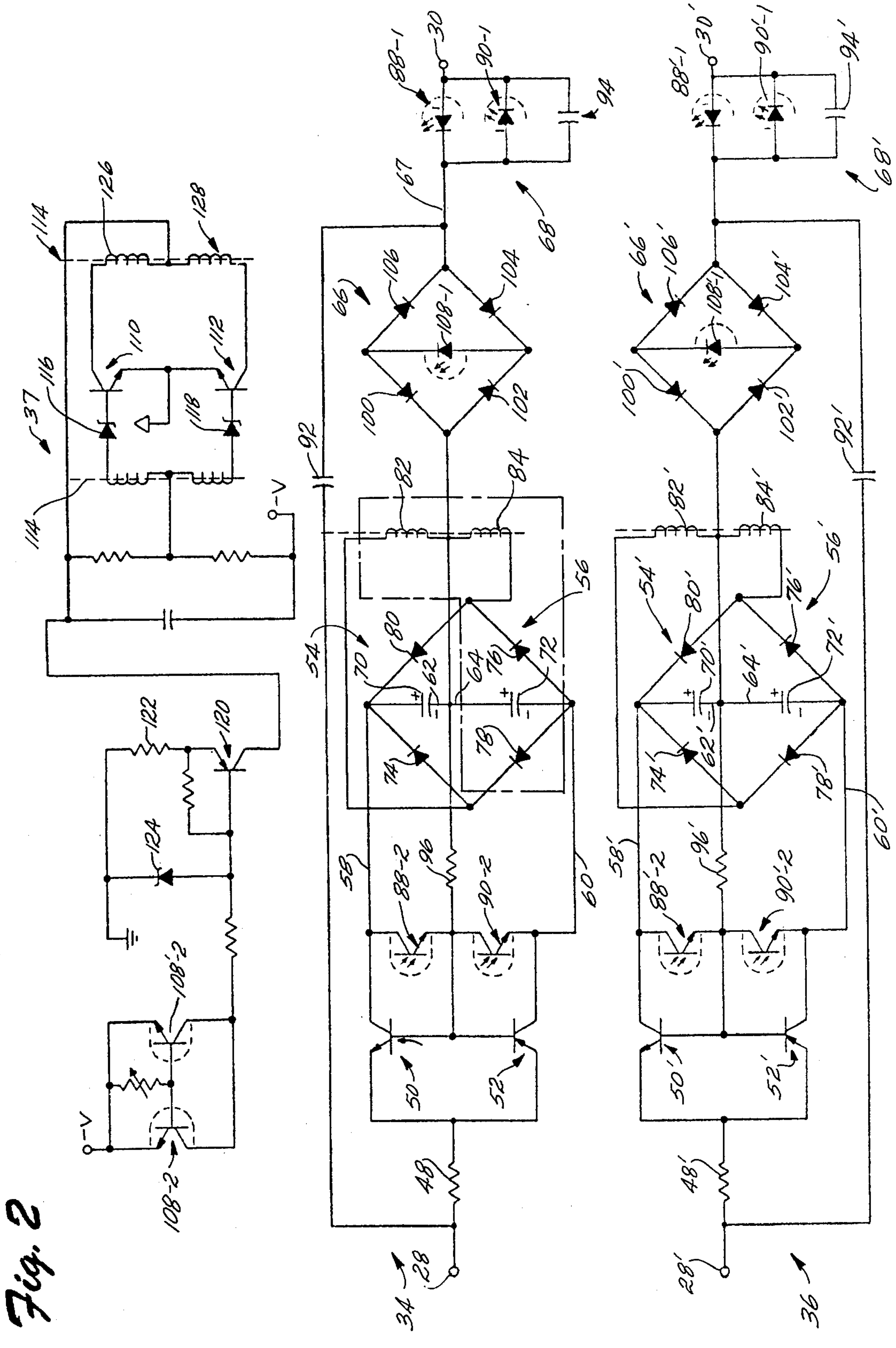
FIG. 2 is a schematic diagram showing the details of the loop extending circuit of FIG. 1 and embodies the present invention.

Refer now to details of the telephone loop extending circuit shown in schematic form in FIG. 2. The telephone loop extending circuit is arranged for aiding central office battery, and, as described above, has first and second voltage insertion circuits 34 and 36 connected between, respectively, pairs of terminals 28, 30 and 28′, 30′. Each voltage insertion circuit has a circuit path for current flow coupled, respectively, between terminals of the corresponding terminal pair. The two voltage insertion circuits 34 and 36 are identical and therefore the following discussion will be directed to the voltage insertion circuit 34, it being understood that the voltage insertion circuit 36 is identical. Identical parts of circuit 36 are identified by the same reference numerals used for circuit 34 but with a prime affixed thereto.

Turning now to the voltage insertion circuit 34, a circuit path is provided between terminals 28 and 30 for providing current flow from terminal to terminal. Included in the current path are first and second transistors 50 and 52, each having base, emitter and collector electrodes. Transistor 50 is an NPN type transistor whereas the transistor 52 is a PNP type.

First and second voltage sources 54 and 56 are provided for separately introducing voltage of opposite polarities in between the terminals 28 and 30. The voltage source 54 has a first side at conductor 58 connected to the collector-electrode (in the emitter-collector electrode circuit) of transistor 50 and a second side at 62 connected through a current sensing circuit 66 (for power supply 37) and a current sensing circuit 68 (part of an optical coupler control system) to terminal 30.

Similarly, the voltage source 56 has a side 60 connected to the collector (in the emitter-collector electrode circuit) of transistor 52 and a second side at conductor 64 connected in the current path through the sensors 66 and 68 to the terminal 30.

The voltage sources 54 and 56 are made up of capacitors 70 and 72 serially connected together, which are connected between opposite terminals of two full wave diode rectifier circuits utilizing diodes 74, 76, 78 and 80. The other two terminals of the full wave rectifier circuit are connected across two serially connected secondary windings 82 and 84 of a transformer 114. The voltage sources 54 and 56, by virtue of their connection through the secondary windings 82 and 84 to the A.C. power supply 37, form floating voltage sources which enable them to be connected in either direction between the terminals 28 and 30.

The junction between the secondary windings 82 and 84 are connected to the sides 62 and 64 of the voltage sources 54 and 56.

Included in the voltage insertion 34 are optical couplers 88 (88-1 and 88-2) and 90 (90-1 and 90-2). The optical coupler 88 includes a current sensing light emitting diode 88-1 and a light sensitive transistor 88-2. The light sensitive transistor 88-2 has collector and emitter electrodes connected between the collector and base electrodes, respectively, of the transistor 50. The transistor 88-2 controls the current flow through the base electrode of the transistor 50 to thereby switch the transistor 50 into and out of a saturated conductive condition which in turn couples and uncouples, respectively, the voltage source 54 between terminals 28 and 30.

The optical coupler 90 includes a current sensing light emitting diode 90-1 and a photosensitive transistor 90-2. The photosensitive transistor 90-2 has collector and emitter electrodes connected between the base and collector electrodes, respectively of the transistor 52 for controlling the base current on the transistor 52 switching it into and out of saturated conductive condition. The optical couplers 88 and 90 are of type MONSANTO Company MCT 26 screened for 70V $BV_{CEO}$ and the light emitting diodes 88-1 and 90-1 are unidirectional devices which are connected together in parallel and the parallel circuit is connected in series in the circuit path between terminals 28 and 30. In this manner, the light emitting diodes 88-1 and 90-1 sense current flow in the circuit path between terminals 28 and 30 in opposite directions to energize the corresponding light sensitive transistors 88-2 and 90-2. When energized, the light sensitive transistors 88-2 and 90-2 cause the voltage on the base electrode of one of the corresponding transistors 50 and 52 to be pulled towards the voltage on its collector electrode thereby enabling that transistor into a saturated conductive condition.

The insertion circuit 34 includes a bypass capacitor 92 which is coupled around the transistor switches 50 and 52 and the voltage sources 54 and 56 from the terminal 28 to the conductor 67. The bypass capacitor 92 provides essentially a short circuit for miscellaneous AC voltage signals including dial pulse noise signals, normal dial pulse signals, and electrical signals caused by lightning. A bypass capacitor 94 for the same purpose, is coupled from conductor 67 to terminal 30 around the photosensitive diodes 88-1 and 90-1. The capacitors 92 and 94 together form capacitor means coupled from terminal 38 to terminal 30 to bypass AC signals around the transistors and voltage sources.

Significant to the present invention, a resistive impedance element in the form of a resistor 96 is coupled between the base electrodes of the transistors 50 and 52 and the sides 62 and 64 of the voltage sources 54 and 56. To be explained in more detail, the resistor 96, in combination with the transistors 50 and 52, provide discharge path for the capacitor 92 after it has been charged by one of the voltage sources 54 or 56 and the central office battery is removed from the terminals.

The sensing circuit 66 includes a bridge formed of semiconductor diodes 100, 102, 104 and 106. Two opposite terminals of the bridge are connected from conductor 67 to the sides 62 and 64 of the voltage sources 54 and 56. The other two opposite terminals of the bridge has, connected therebetween, a light emitting diode 108-1 of a photocoupler 108 (108-1, 108-2). To be explained in more detail, the diodes 100 and 104 are polled in one direction so that when a negative potential is applied on terminal 28 with respect to terminal 30, current flows through diodes 104, 108-1 and 100 to one side of the resistor 96. Similarly, diodes 102 and 106 are polled in the opposite direction such that when a positive potential is applied on terminal 28 with respect to terminal 30, current flows from resistor 96 through diodes 102, 108-1 and 106 to conductor 67. In this way, the light emitting diode 108-1 receives current and emitts light, thereby causing the power supply 37 to be turned on responsive to current flow in either direction between terminals 28 and 30.

Turning now to the power supply 37, there is a self-saturating inverter comprised of transistors 110, 112 and a transformer 114. The transistors 110 and 112 are active elements in the inverter. Zener diodes 116 and 118, are placed in series with the base electrodes of the transistors 110 and 112 to prevent excess driving voltage from developing across their emitter base junctions. A transistor 120 serves a dual purpose of regulating the current to the inverter and also serves as the second stage of an on-off type circuit. To be explained in more detail, if current should flow between terminals 28 and 30 and/or between terminals 28' and 30', photosensitive transistors 108-2 and/or 108'-2 will be switched to a conductive condition. This then causes current to start flowing through the transistor 120, which in turn causes a voltage drop across a resistor 122, which is serially connected between the emitter of transistor 120 and ground. When the voltage across the resistor 122 approaches the Zener breakdown voltage of a Zener diode 124, the transistor 120 will start to turn off limiting the current to the inverter. The output signal across the primary windings 126 and 128 of transformer 114 are coupled to the secondary windings 82, 84 and 82', 84' of the transformer 86 causing the capacitors to charge up as indicated. As a result, the output of the inverter charges the capacitors 70, 72 and 70', 72', thereby voltages of opposite polarity are provided on sides 62 and 64, and hence, the voltage sources 54 and 56 of the capacitors 70 and 72 with respect to the other sides. To this end, transformer 114 has secondary windings 82 and 84 and secondary windings 82' and 84', providing DC isolation between primary and secondary windings of the transformer 114. The transistors 110, 112 and transformer 114 form part of a conventional free-running, self-saturating oscillator, the details of which are well known in the oscillator art and need not be explained herein for a full understanding of the invention.

Consider now examples of the operation of the loop extender disclosed in FIG. 2. First, with reference to FIG. 1, assume that central office battery applies a positive potential on terminal 28 with respect to terminal 28' and that the subscribers telephone goes off hook, thereby causing an electrical connection between terminals 30 and 30'. The resistors 96 and 96' cause the transistors 52 and 50' to be biased so that a slight amount of current flows through the collector to emitter electrode circuits of the transistors. This current plus other leakage current in the circuit causes current to flow from left to right through the circuit path of the insertion circuit 34 and from right to left through the circuit path of the insertion circuit 36. The current flow thus established will be through emitter to collector electrodes of the transistor 52, diode 102, photosensitive diode 108-1, diode 106 and photodiode 90-1. Through the voltage insertion circuit 36, the current will pass through photosensitive diode 88'-1, diode 104' photoemitting diode 108'-1, diode 100' through collector to emitter electrodes of transistor 50' back to terminal 28'. Current thus flowing through photoemitting diodes 108-1 and 108'-1 switches both of the photosensitive transistors 108-2 and 108'-2 into a saturated conductive condition, thereby enabling the transistor 120 to turn on the free running oscillator, thereby causing AC signals to be formed in the secondary windings 82, 84, 82' and 84'. It should be noted however, that the power supply will be turned on here to the presence of applied coupler 108 and 108' even though current flows through the circuit path of only one voltage insertion circuit.

The current flow through photo-emitting diodes 90-1 and 88'-1 apply light to the photo-sensitive transistors 90-2 and 88'-2, respectively, thereby switching them into a saturated conductive condition, pulling the potential on the base electrodes of the transistors 52 and 50' approximately to the potential on the collector electrodes. As a result, the negative side 60 of the voltage source 56 is coupled through transistor 52 to terminal 28 and the positive side 64' of source 54' is coupled through transistor 50' to terminal 28'. Thus the voltage source capacitors 72 and 70' are connected in series in the circuit path in between terminals 28 and 30 and 28' and 30', respectively, aiding the central office battery voltage.

Should the central office battery be connected across terminals 28 and 28' with the opposite polarity, e.g., a negative potential on terminal 28 with respect to terminal 28' the photo-emitting diodes 88-1 and 90'-1 would sense current flow and in turn cause photo-sensitive transistors 88-2 and 90'-2 and transistors 50 and 52' to be switched into saturation. As a result voltage sources 54 and 56' are switched into series circuit in the circuit path between terminals 28 and 30 and 28' and 30', respectively thereby establishing the same magnitude of voltage but of opposite polarity between terminals. The photo emitting diodes 108-1 and 108'-1 have current flowing therethrough which in turn switches transistors 108-2 and 108'-2 into saturation and hence turns on power supply 37 resulting in the charge across the capacitors 70, 72, 70', 72'.

Return now to the first example where a positive to negative potential is applied from terminal 28 to terminal 28', terminals 30 and 30' are connected together, voltage sources 56 and 54' are switched into series circuit between the terminals 28 and 30, and 28' and 30' respectively, and the power supply 37 is on, applying AC signals across the capacitors 70, 72, 70' and 72'.

The full wave rectifier circuit cause the capacitors 72 and 70' to be charged as indicated, thereby causing negative to positive potentials to be applied from terminal 28 to terminal 30 and from terminal 30' to terminal 28'. As a result, the bypass capacitor 92 charges up with a minus to positive potential from left to right and the bypass capacitor 92' charges up with a negative to positive potential from right to left.

Assume now that the loop extender depicted in FIG. 2 is in a system such as the Electronic Switching System where the terminals 28 and 28' momentarily open circuits and then reconnects central office battery. Under these conditions, current immediately stops flowing between terminals 28 and 30 and 30' and 28' and the photodiodes 90-1 and 88'-1 previously energized, are de-energized causing the photosensitive transistors 90-2 and 88'-2 to switch into non-conduction in turn causing the transistors 52 and 50' to switch towards non-conduction. Referring now specifically to voltage insertion circuit 34, it should be carefully noted that the resistor 96 completes a current path from capacitor 92, diodes 104, 108-1, 100, base to emitter electrodes of transistors 50 and 52 and back to the other side of the capacitor 92. With the negative to positive potential from left to right across capacitor 92, current flows into the base electrodes of the transistors 50 and 52, tending to switch the transistor 50 (formerly off) into conduction and the transistor 52 (formerly on) towards non conduction. In this manner the current path through the resistor 96 and base electrodes of the transistors 50 and 52 help discharge the capacitor 92. The voltage across capacitor 70 provides also the power for transistor 50 during its discharge operations.

In addition, if the charge across capacitor 92 is sufficiently high so that the current flowing through light emitting diode 108-1 causes it to switch the photosensitive transistor 108-2 into conduction, power is applied across capacitors 62 and 64 aiding in the discharge of the capacitor 92 through transistor 50. As the capacitor 92 discharges, a point will be reached where the current flow through the light emitting diode 108-1 is insufficient to keep transistor 108-2 switched at which time the applied power across capacitors 70 and 72 will cease.

Due to the rapid discharge of the capacitor 92 as described above, should the central office reconnect the terminals 28 and 28′ back to central office battery, but in a reverse polarity from that in which they were originally connected, the capacitor 92 only needs to charge up, in the opposite direction, from the point at which it has been discharged rather than having to go through a complete cycle of discharge and recharge. Also due to the rapid discharge of capacitor 92 the possibility of sending an erroneous signal at the central office that appears like a dial pulse is eliminated.

Although the above example was given for one polarity of signal between terminals 28 and 28′, it will be understood that should the polarity of the signals be reversed, the same action will take place but in the opposite direction. Further, it will be noted that although the above explanation was given for insertion circuit 34, the same principals apply for the insertion circuit 36. Thus, it should now be understood that the resistors 96 and 96′ tend to bias the one of transistors 50 and 52 which was originally on to an off condition and the one originally off to an on condition. However, this bias does not override the bias provided by the optical couplers and only becomes effective when the optical couplers have been turned off as occurs during a polarity reversal process or open loop.

For simplex operation such as in FIG. 1A where separate circuit paths are established between terminal pair 28 and 30, and terminal pair 28′ and 30′, the direction of current flow is in the same direction in both insertion circuits 34 and 36. If positive battery is applied on both the terminals 28 and 28′ with respect to the terminals 30 and 30′, photodiode 108-1, photosensitive transistor 90-2, and transistor 52 switch on, placing capacitor 72 in series with the line in between terminals 28 and 30. Additionally, in insertion circuit 36, the photo-emitting diode 108′-1, photosensitive transistor 90′-2 and transistor 52′ switch on, placing capacitor 72′ in series with the other side of the line in between terminals 28′ and 30′. It should be noted that the voltage insertion circuits 34 and 36 are completely isolated from one another as there is nothing that references the voltage between circuits. The only thing that determines the polarity of the insertion voltage in either side of the line is the current flowing through that line. This means that the loop extender can be placed any place in the line or it can be pulsed from either end. In essence, there is no difference between the input and outputs so that it can actually be placed in a line backwards. Since either end may be open circuit with no deleterious effects, the loop extender works in the electronic switching system office with its "open switch interval" as well as in more conventional type telephone offices. Additionally, it will be noted that the AC bypass capacitors 92 and 94 and the bypass capacitors 92′ and 94′ completely bypass AC signals around the voltage insertion circuits so that neither circuit will respond to ring signals, thus eliminating the need for ring defeat circuitry.

Additionally, the sensing circuit 66 could be replaced by a short circuit should it be desirable not to switch the power supply on and off. However, it is desirable to switch the power supply on and off since it reduces power consumption by the loop extender.

Although an exemplary embodiment of the invention has been disclosed for purposes of illustration, it will be understood that various changes, modifications and substitutions may be incorporated in such embodiment without departing from the spirit of the invention as defined by the claims appearing hereinafter.

What is claimed is:

1. A telephone loop extending circuit for aiding central office battery and having first and second voltage insertion circuits, each voltage insertion circuit comprising: a pair of terminals, a circuit path for current flow coupled between terminals of the corresponding pair of terminals and comprising first and second voltage source means, first and second transistors each having base, emitter, and collector electrodes, first sides of said first and second voltage source means, of opposite voltage polarity, being coupled in the circuit path to a first terminal of the corresponding terminal pair, the emitter-collector electrode circuits of said first and second transistors being coupled in the circuit path from a second terminal of the corresponding pair to second sides of, respectively, said first and second voltage source means, optical coupling means corresponding to each said transistor and comprising a light responsive control means coupled to the base electrode of the corresponding transistor for controlling current flow therein and light emitting sensing means coupled in series in the circuit path for sensing externally applied current flow between terminals of the corresponding terminal pair and for applying light to the corresponding light responsive control means, thereby causing the latter to switch the corresponding transistor into saturated conduction coupling the corresponding voltage source means in series in the circuit path and in between terminals of the corresponding terminal pair, bypass capacitor means for bypassing selected signals around the portion of the circuit path formed by said transistors and voltage source means between two places along said circuit path, the improvement in each voltage insertion circuit comprising:

impedance means coupled between the base electrodes of said first and second transistors and the first sides of said first and second voltage source means, and operative, in combination with at least one of said first and second transistors for providing a discharge path for the corresponding bypass capacitor means after removal of central office battery applied from a terminal in one voltage insertion circuit to a terminal in the other voltage insertion circuit.

2. A telephone loop extending circuit according to claim 1 wherein said light emitting sensing means comprises unilateral current conductive means, the unilateral conductive means of each insertion circuit being coupled together in parallel circuit relation in opposite directions of current flow and in series circuit relation with the current flow through the circuit path between terminals of the corresponding pair.

3. A telephone loop extending circuit according to claim 2 wherein the parallel coupled unilateral conductive means are coupled in the corresponding circuit path in between the voltage source means and one terminal of the corresponding terminal pair and wherein said bypass capacitor means comprises first bypass capacitor means coupled from a first position in the corresponding circuit path in between the unilateral conductive means and the voltage source means to a position in the corresponding circuit path on the other side of the transistors and voltage source means and second bypass capacitor means coupled from the first position to a further position in the circuit path on the other side of the unilateral conductive means.

4. A telephone loop extending circuit according to claim 1 wherein said first and second voltage source means comprise first and second serially connected capacitor means and first and second full wave rectifier circuits for applying signals across, respectively, the first and second capacitor means, the first side of each of the voltage source means being at the common side of the capacitor means and the second side of the first and second voltage source means being at the other side, respectively, of the first and second capacitor means and additionally comprising in each insertion circuit a light emitting means coupled in the respective circuit path for forming light responsive to current flow in either direction, and controllable power supply means comprising means responsive to said light from either insertion circuit for enabling the power supply to commence applying alternating current exitation signals across said rectifier circuits in both said insertion circuits.

5. A telephone loop extending circuit according to claim 4 wherein said light emitting means of each insertion circuit comprises unilateral current conductive means and a diode rectifier circuit for coupling current flowing in either direction along the circuit in one direction through the unilaterally conductive means.

6. A telephone loop extending circuit for aiding central office battery, comprising:

a. first and second pairs of terminals;

b. first and second voltage insertion circuits corresponding, respectively, to the first and second pairs of terminals, each voltage insertion circuit having a circuit path for current flow coupled, respectively, between terminals of the corresponding pair of terminals, each voltage insertion circuit comprising:

1. first and second voltage sources,
2. first and second transistors each having base, emitter, and collector electrodes, first sides of said first and second voltage sources, having opposite voltage polarity, being coupled, in the circuit path, to the first terminal of the corresponding terminal pair, the emitter-collector electrode circuits of said first and second transistors being coupled, in the circuit path, from a second terminal of the corresponding pair to second sides of, respectively, said first and second voltage sources,
3. optical coupling means for corresponding to each of said transistors and comprising a light responsive transistor having emitter and collector electrodes coupled between the base electrode and the emitter-collector electrode circuit of the corresponding transistor and a light emitting diode coupled in series in the circuit path for sensing externally applied current flow between terminals of the corresponding terminal pair and responsive to such applied current for applying light to the corresponding light responsive transistor thereby causing the latter to switch the corresponding transistor into saturated conduction coupling the corresponding voltage source in series in the circuit path and in between terminals of the corresponding pair,
4. bypass capacitor means for bypassing selected signals around the portion of the circuit path formed by said transistors and voltage sources between two places along said circuit path, and
5. impedance means coupled between the base electrodes of said first and second transistors and the first sides of said first and second voltage sources, and operative, in combination with at least one of said first and second transistors for providing a discharge path for the corresponding bypass capacitor means after removal of central office battery applied from a terminal in the first pair of terminals to a terminal in the second pair of terminals.

7. A telephone loop extending circuit for aiding central office battery comprising: first and second voltage insertion circuits, each comprising a. a pair of terminals, b. first and second voltage source means, c. first and second transistors each having a base electrode and an emitter-collector electrode circuit, d. means for coupling first sides, of opposite voltage polarity, of said first and second voltage source means to a first terminal of the corresponding terminal pair, e. means for coupling one side of the emitter-collector electrode circuit of each of said first and second transistors to a second terminal of the corresponding terminal pair, f. means for coupling the other side of the emitter-collector electrode circuit of each of said first and second transistors to second sides of, respectively, said first and second voltage source means, g. first and second optical coupling means corresponding to said first and second transistors, respectively, each for sensing current flowing between terminals and, each being responsive to current flow in one of two opposite directions between terminals for enabling the corresponding transistor to couple the corresponding voltage source to the second terminal of the corresponding pair, h. bypass capacitor means coupled from one terminal to the other of the corresponding pair for passing selected signals around said transistors and voltage source means and i. impedance means coupled between the base electrodes of said first and second transistors and the first sides of said first and second voltage source means, and operative, in combination with at least one of said first and second transistors for providing a discharge path for the bypass capacitor means after removal of central office battery applied from a terminal in the first voltage insertion circuit to a terminal in the second voltage insertion circuit.

* * * * *